INVENTOR.
JULIUS LERNER

June 28, 1966  J. LERNER  3,257,842
STREAM MOISTURE INDICATOR
Filed Dec. 23, 1963  2 Sheets-Sheet 2

INVENTOR.
JULIUS LERNER
BY George L. Church
ATTORNEY

United States Patent Office 3,257,842
Patented June 28, 1966

3,257,842
STREAM MOISTURE INDICATOR
Julius Lerner, Broomall, Pa., assignor to Sun Oil Company, Philadelphia, Pa., a corporation of New Jersey
Filed Dec. 23, 1963, Ser. No. 332,831
4 Claims. (Cl. 73—53)

This invention relates to an indicator or recorder for the measurement of moisture in a fluid stream. This stream may comprise hydrocarbon material, or other material incompatible with water.

In the case of many hydrocarbon streams, such as occur in petroleum refineries, it is essential to measure the moisture content, when that exists in an amount which may be on the order of only a few parts per million. By way of example, propane sold for domestic consumption must contain less than about thirty parts per million of water. Feedstreams in various processes must also be kept at less than some very low water content, for optimum performance of the processes. Laboratory procedures for the checking of such low moisture content are known, but they are not suitable for continuous stream monitoring.

Recently, there has been developed a device which effects continuous measurement of the moisture content of a fluid stream. One example of such a device is disclosed in my copending application, Serial No. 297,650, filed July 25, 1963. In the device of said application, a desiccant or water-sorptive material adsorbes moisture from a fluid hydrocarbon stream, in proportion to the amount of water in the stream; the dielectric constant of the wet desiccant is measured, by means of a capacitance measuring or determining circuit, in order to determine the water content of the stream.

Ordinarily, pigging of the main line (through which the stream to be measured is flowing) is contemplated, so that the desiccant-type cell cannot be placed directly in such line. Also, if the cell were placed in the main line, in order to make repairs to the cell it would be necessary to shut off the main line; this is definitely undesirable. To satisfy these conditions, the cell was placed in a bypass line, through which a side or "drag" stream was made to flow. To ensure a sufficient flow rate for this "drag" stream, one of two expedients had to be resorted to. Either a pump had to be utilized in the bypass line, or a valve (or orifice) inserted in the main line, to crease a pressure drop therein. It is obviously desirable to be able to eliminate this requirement of a pump or valve.

Sometimes, with the drag-stream type of cell or sensor, particularly where the cell is located some distance away from the main pipe, a sample heater is required for proper operation of the moisture indicator. This necessitates making power available at the cell, which is inconvenient and also uneconomical.

For a drag-stream type of cell, auxiliaries such as a filter and a flow indicator are required in the bypass or drag stream line; it is desirable to be able to eliminate such auxiliaries.

An object of this invention is to provide a novel form of cell for continuous monitoring of the moisture content of a hydrocarbon stream.

Another object is to provide a stream moisture indicator which does not project into nor block the main pipe, yet which does not require a bypass line.

A further object is to provide a stream moisture indicating device which does not require any auxiliary elements, such as pumps, valves, filters, flow indicators, etc., and which is therefore simpler and less expensive than prior devices.

The objects of this invention are accomplished, briefly, in the following manner: The pipe through which the liquid stream (whose moisture content is to be measured) is flowing has an opening through the wall thereof. A chamber (e.g., the body of a valve) is sealed to the wall of the pipe at the opening; this chamber communicates through the opening with the interior of the pipe. A moisture cell or sensor is mounted in the chamber, on the opposite side of the valve disc, gate, or plug; this cell includes a pair of spaced porous conductive (capacitor) plates with a granular water-sorptive dielectric material (desiccant) therebetween. The construction of this cell is such that turbulent flow of the liuqid into and within said chamber causes liquid to flow along the capacitor plates, from whence it diffuses into and wets the granular dielectric material.

A detailed description of the invention follows, taken in conjunction with the accompanying drawings, wherein.

Figure 1:
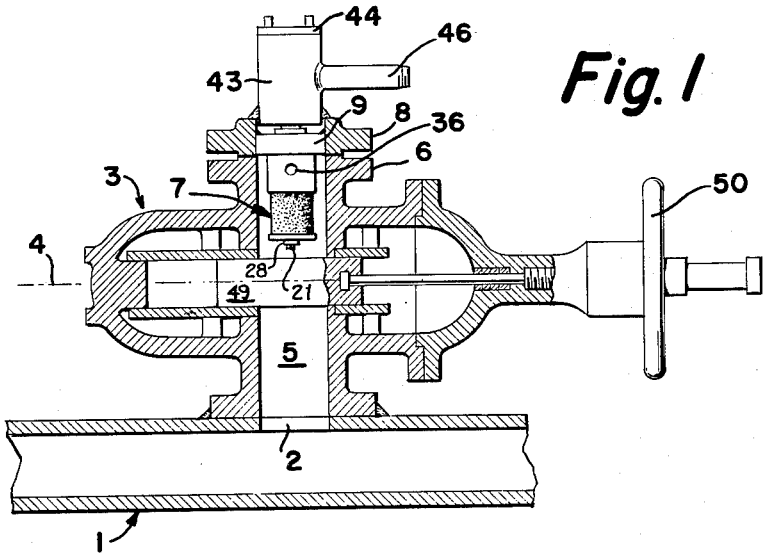
FIG. 1 is a vertical section through a moisture indicator sensor assembly according to the invention, shown installed on a pipeline, the sensor being shown in elevation.

Refer first to FIG. 1. A pipe 1 carries the fluid stream which is to be monitored for moisture content. By way of example, this stream may be a hydrocarbon stream having a moisture content on the order of a few parts per million. Pipe 1 has an opening 2 through the cylindrical wall thereof, and the body of a valve 3 is sealed to the pipe wall at this opening. Valve 3 is of the straight-through, full-opening, or full-way type, such as a disc valve, or it may be a gate valve or plug valve; FIG. 1 illustrates an "outside screw and yoke pipeline gate valve." Valve 3 is mounted so that its center line 4 extends in a direction substantially parallel to the longitudinal axis of pipe 1. The bore of the body of valve 3 provides a chamber 5 which communicates through opening 2 with the interior of pipe 1. The disc 49 of valve 3 is centered on line 4, and is movable along this line by an external handwheel 50 to provide a transverse partition across chamber 5 (when the valve is "closed") or to open completely this chamber (when the valve is "open"). Since valve 3 is of the full-way type, it does not interfere when open with the free flow of fluid in chamber 5. Valve 3 is flanged, having a horizontal flange 6 at its upper end.

A sensor or desiccant-type moisture cell, denoted generally by numeral 7, is positioned within chamber 5, on the opposite side of valve center line 4 from pipe 1, such that when valve 3 is closed this cell will be sealed off from pipe 1 and may then be repaired or removed. Cell 7 is shown as being mounted on a flange 8 and will be described as such, but mountings of other types may be used if desired. When the device is assembled for use to measure moisture content, flange 8 is secured to valve flange 6 by the usual type of flanged coupling, including bolts and nuts (not shown).

Figure 2:
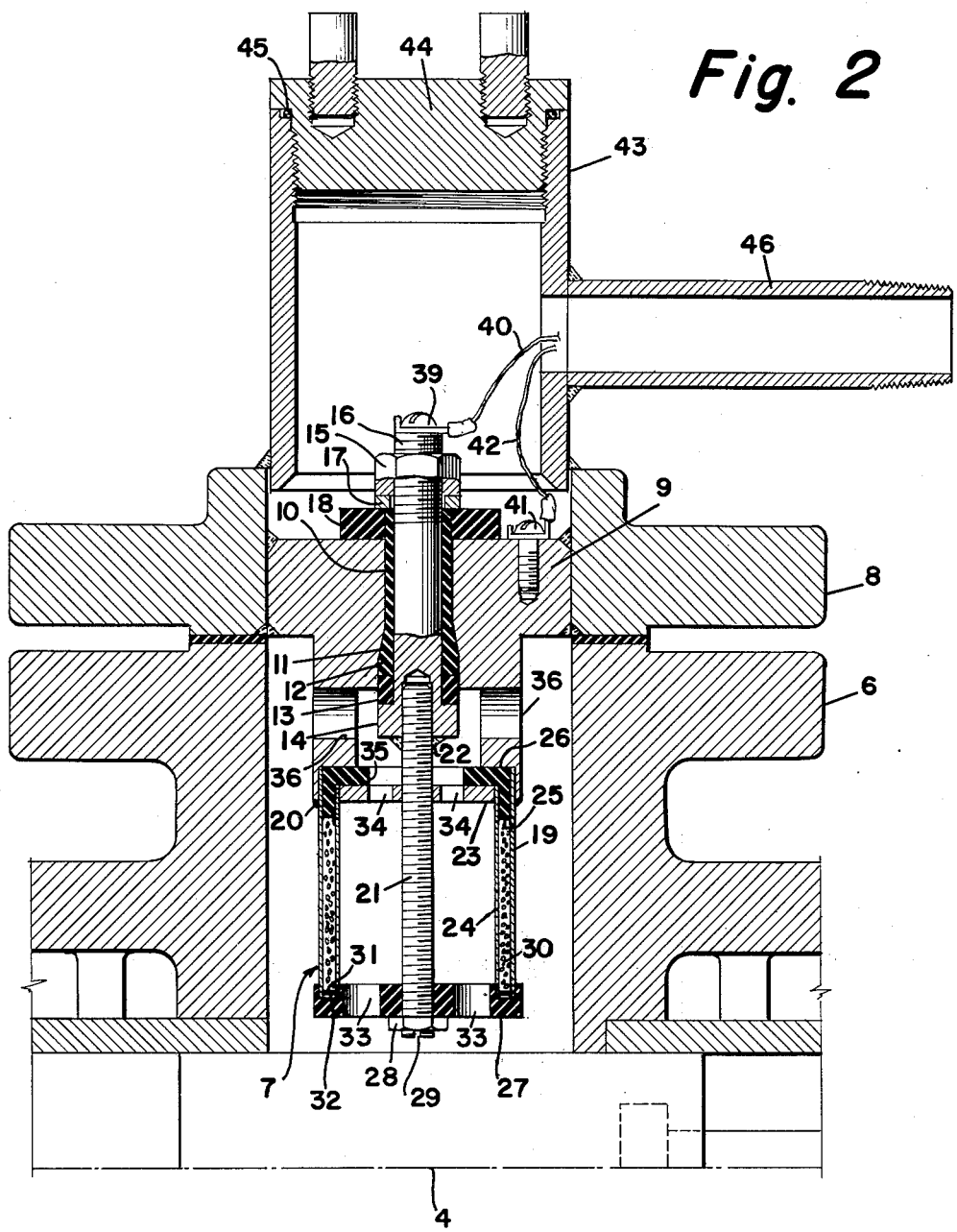
FIG. 2 is a sectional view, on an enlarged scale, of a portion of FIG. 1, illustrating the construction of the sensor.

A supporting plate 9 is welded into flange 8, this plate having therein a central bore 10 (see FIG. 2) which tapers outwardly to a larger diameter at its lower end, as at 11. A tapered, compressible electrically insulating sleeve or bushing 12 fits in bore 10, 11. Bushing 12 may be made, for example, from the tetrafluoroethylene polymer known as Teflon. The upper end of a cylindrical follower or spacer 13, made from an electrical insulating material, bears against the lower end of sleeve 12, the opposite end of this spacer overlying the head at the lower end of a threaded rod 14. A nut 15 engages the threads 16 at the upper end of rod 14, the lower end of this nut bearing against a flat metal washer 17, which in turn bears against an electrically insulating washer 18 positioned on the upper face of plate 9. Nut 15 in effect bears on plate 9. When this nut is tightened, the upward force produced on rod 14 is transmitted through spacer 13 to bushing 12, and this bushing is forced upwardly to form a pressure-tight seal against taper 11. Washer 18 serves to electrically insulate nut 15 from ground (plate 9).

A tubular element (hollow, open-ended cylinder) 19, made of a porous metallic (conducting) material such as sintered metal, is welded (at its upper end) to the lower face of plate 9 at 20, and serves as the grounded electrode of an electrical capacitor.

A threaded rod 21 is secured by weldment 22 to the lower end of rod 14, and extends downwardly from the latter. A metal ring 23 is threaded onto rod 21, and a tubular element (hollow, open-ended cylinder) 24, made of a porous metallic (conducting) material such as sintered metal, is welded at its upper end to the outer edge of ring 23. The inner tube 24 serves as the ungrounded electrode of the capacitor, of which outer tube 19 is the grounded electrode. Tubes 24 and 19 are coaxial or concentric, and are spaced from each other; they are more or less coextensive, lengthwise. Tube 24 is fastened to rod 21 by means of threaded ring 23.

A ring 25, made of electrical insulating material, is positioned between tubes 19 and 24, at the upper ends thereof, and keeps grounded plate 19 from touching the ungrounded plate 24. Insulating ring 25 extends radially, as well as longitudinally, and is clamped between the upper end of tube 24 (and also ring 23) and a downwardly-facing shoulder 26 provided at the lower end of plate 9.

A cap 27, made of insulating material, threads onto the lower end of threaded rod 21 and is locked in place by a lock nut 28. The lower end of rod 21 is slotted as at 29, this slot being used in assembly to keep rod 14 from turning when clamp nut 15 is tightened. The various dimensions are such that when cell 7 is in assembled position in the body of valve 3, the lower end of rod 21 (which is the lowest part of cell 7) is sufficiently above the movable disc or gate 49 of this valve so that the cell offers no interference or obstruction to the free movement of said disc or gate.

In cell 7, the annular space between tubular members 19 and 24 is filled with a suitable granular desiccant or water-sorptive dielectric material 30, such as activated alumina. To fill this annular space with desiccant 30, sensor or cell 7 being removed from valve 3 and inverted so that slot 29 is up, the annular space between tubes 19 and 24 is filled with granular desiccant 30 and a soft, resilient, insulating gasket 31 is placed in groove 32 of insulating cap 27. Cap 27 is then screwed onto threaded rod 21 and lock nut 28 is screwed onto rod 21. Gasket 31 prevents the desiccant 30 from coming out of the open end of the annulus.

To use the moisture indicator, the sensor 7 is installed in the valve chamber 5 and the flanges 6 and 8 are bolted together. The stream being monitored for moisture content flows horizontally in pipe 1. Due to turbulent flow of the liquid through opening 2, there will be a mixing of the liquid in pipe 1 and chamber 5. This will cause the liquid in chamber 5 to be continuously swept out and replaced with liquid flowing in pipe line 1.

Cap 27 has a plurality of holes 33 therethrough, which allow free circulation of the liquid into and out of the lower end of sensor or cell 7, and thus free access of the liquid to the inner wall of porous tube 24. Holes 33 are of course located radially outwardly from the central portion of cap 27, which latter portion, as previously described, threads onto rod 21; these holes are located radially inwardly from the tube 24. Ring 23 has a plurality of holes 34 therethrough, which are located radially outwardly from the central portion of this ring, which latter portion, as previously described, is threaded onto rod 21; holes 34 are located radially inwardly from tube 24, in such a position that their radially-outer edges are approximately vertically aligned with the radially-inner edge of ring 25. The annular space within ring 25 provides an annular opening 35 around rod 21. The center lines of holes 33 and 34, and of annular opening 35, all extend longitudinally of chamber 5 or at right angles to the axis of pipe 1, i.e., vertically in FIG. 2.

A pair of diametrically-opposite, axially-aligned holes 36 are provided in plate 9, in approximate horizontal alignment with the head of rod 14, these holes allowing the free flow of liquid between the outer surface of the outer tube 19 and the inner surface of the inner tube 24. The common center line of holes 36 extends transversely of chamber 5 or parallel to the axis of pipe 1, i.e., horizontally in FIG. 2.

It has been previously stated that (due to turbulent flow through opening 2) there will be a mixing of the liquid in pipe 1 and chamber 5, when liquid is flowing in pipe 1. The liquid will circulate through holes 33, past the inner surface of inner tube 24, thence through holes 34, 35, and 36, and past the outer surface of outer tube 19. Due to the turbulent flow conditions set up in chamber 5, the liquid will also flow or circulate in the reverse direction, to wit, past the outer surface of tube 19, thence through holes 36, 35, and 34, and down past the inner surface of tube 24.

Figure 3:
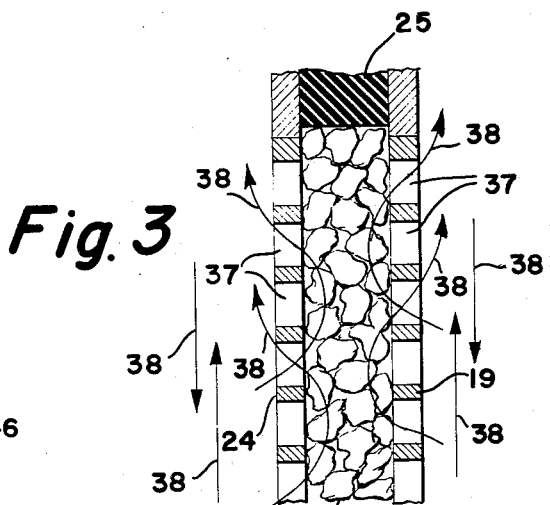
FIG. 3 is a portion of FIG. 2, drawn somewhat schematically and on an enlarged scale.

FIG. 3 is a schematic representation, on an enlarged scale, of the two porous tubes 19 and 24, and granular desiccant 30. The porosity of tubes 19 and 24 is represented (greatly exaggerated) by holes 37. The liquid flow is past the outer surface of tube 19 and the inner surface of tube 24; the liquid wets the desiccant 30 by diffusion through holes 37 (i.e., through the pores of the tubes). Flow lines 38 show the path of the liquid past the tubes, and the diffusion of the liquid into the desiccant.

Since the radial distance between tubes 19 and 24 is small, on the order of .030 inch, and since the liquid comes into contact with both sides of the desiccant 30, the time required for the desiccant to reach equilibrium with the stream in pipe 1 is short.

The cell or sensor 7 comprises a concentric cylindrical capacitor, with the annular space between the electrodes 19 and 24 of the capacitor filled with the granular desiccant 30. The stream to be monitored (i.e., the stream flowing in pipe 1), due to turbulent flow and diffusion, comes into contact with the desiccant 30 between the electrodes 19 and 24. Water dissolved in the stream is adsorbed on or desorbed from the desiccant to maintain equilibrium with the changing moisture content of the stream, at the same time changing the capacitance of the capacitor.

The desiccant-type moisture cell described can be used whenever the desiccant has a much greater affinity for water than for the stream material, in which case the relative concentration of water on the desiccant is much higher than the relative concentration of water in the flowing stream. Thus, small changes in stream moisture cause relatively large changes in moisture content of the desiccant, with corresponding changes in capacitance. This amplifying effect of the desiccant, together with the relatively high dielectric constant of water, permits determination of very low water concentrations in the stream.

Referring again to FIG. 2, a screw 39, threaded into a longitudinal tapped hole provided in the upper end of rod 14, makes the electrical connection for an ungrounded lead 40; this electrical connection extends to inner tube 24 via elements 14, 21, and 23. A screw 41, threaded into a blind tapped hole provided in the upper face of plate 9, makes the electrical connection for a ground lead 42; this grounded connection extends to outer tube 19 via plate 9, which is in metallic contact with tube 19. Wires 40 and 42 connect the sensor 7 to electronic circuitry which will be referred to hereinafter.

A junction box 43 is secured as by welding to the upper side of flange 8. A top closure 44 is threadedly secured to the upper end of box 43, an O-ring gasket 45 being used as a closure seal. A pipe 46, one end of which is welded to the side junction box 43, serves as an electrical conduit for wires 40 and 42.

A circuit arrangement eminently suitable for measurement of such small capacitance changes as occur in the operation of the present apparatus, is disclosed in Shawhan Patent No. 3,073,160, dated Jan. 15, 1963. Said Shawhan patent is incorporated herein by way of reference. Since the aforementioned circuit constitutes no part of the present invention, and since such circuit is described in detail in said prior patent, it will not be described herein in detail. The leads 40 and 42 are connected to a "remote transmitter" unit, which is located in an explosion proof condulet close to the cell 7; this unit is in turn connected to an "electronic chassis" by a coaxial cable or twisted pair. The chassis is normally located in a control room.

When the remote transmitter is energized with a low voltage 15 kc. signal from the chassis, the combination of capacitors and inductors in the transmitter will produce a change in voltage which is linear with changes in the measured capacitance of the moisture cell 7. By means of a switching circuit, a stable reference capacitor, whose capacitance value is similar to that of the cell 7) contained in the remote transmitter is substituted for the moisture cell five times per second. While the reference capacitor is connected, the D.C. output of the chassis is used to standardize the oscillator amplitude and correct for component changes (including transmission cable), temperature, and line voltage fluctuations. An accurate scale factor is established between remote capacitance and chassis output voltage. This scale factor is used to measure the moisture cell capacitance (i.e., the capacitance between tubular electrodes 19 and 24). The output of the chassis, normally presented on a remote recorder, is a unidirectional voltage corresponding to the difference between the remote reference capacitor and the moisture cell capacitance. A small difference between the two is measured with better accuracy than either one alone. The capacitance measuring system used has a long term stability better than 0.25 pf. and is linear over a range of 400 pf.

It is pointed out that the capacitive-type moisture analyzer described does not measure directly the water dissolved in the stream, but rather the water adsorbed on the desiccant. However, this adsorbed water is in equilibrium with the water dissolved in the stream, and therefore the former can be used as a measure of stream moisture.

When it becomes necessary to repair or replace the cell 7, it is an easy matter to close valve 3, thereby to completely isolate this cell from the line 1. It is obviously not necessary to shut down the main line when maintenance of cell 7 is required.

Since the moisture cell operates "dead-ended" off the main pipe 1, no extra pumps or valves are required to cause flow, as are needed for a side or "drag" stream. Also, since the moisture cell operates from liquid flowing through the main line, no sample heated is needed, thus eliminating the need for power at the cell; no auxiliaries such as filter, flow indicator, etc. are required. Summing up, the foregoing demonstrates that the device of the present invention has a cheaper overall installed cost than the side stream unit.

None of the components of the assembly of FIG. 1 project into pipe 1, so that this pipe may be "pigged" at any time without interference.

Figure 4:
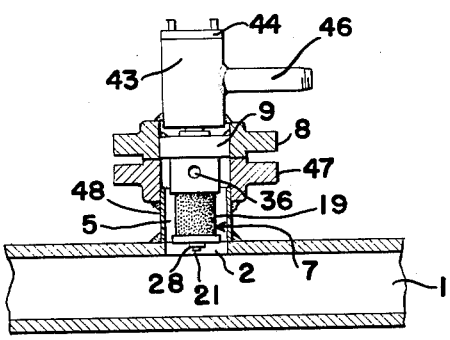
FIG. 4 is a view, partly in vertical section, of a modified sensor assembly.

In some cases, it might not be considered necessary to use the isolation valve 3. In such an event, the moisture cell may be mounted closer to the main pipe than in FIG. 1. Refer now to FIG. 4. Here, the valve 3 is omitted, being replaced by a nozzle which comprises a horizontal flange 47 joined to pipe 1 by means of a short length of tubing 48. The cell flange 8 is coupled to nozzle flange 47 in the same way that flanges 8 and 6 are coupled in FIG. 1. In this FIG. 4 assembly, the sensor or cell 7 is so located that the lower end of rod 21 is just radially beyond the inner wall of pipe 1, centered in opening 2. In all other respects, the construction and configuration of FIG. 4 are exactly like those of FIG. 1, previously described.

The invention claimed is:

1. In combination with a pipe through which a liquid stream can flow, said pipe having an opening through the wall thereof: a chamber sealed to the wall of said pipe at said opening and communicating through said opening with the interior of said pipe, and a capacitive-type stream moisture cell mounted in said chamber, said cell comprising a pair of spaced conductive concentric porous tubular members, and a water-sorptive dielectric material in the annular space between said members.

2. In combination with a pipe through which a liquid stream can flow, said pipe having an opening through the wall thereof: a chamber sealed to the wall of said pipe at said opening and communicating through said opening with the interior of said pipe, and a capacitive-type stream moisture cell mounted in said chamber, said cell comprising a pair of conductive porous tbublar members, means mounting said members in spaced coaxial relationship, said means being apertured to permit liquid present in said chamber to flow freely along the inner surface of the inner tubular member, and a water-sorptive dielectric material in the annular space between said tubular members.

3. Combination as set forth in claim 2, wherein said cell is located entirely outside the bore of said pipe.

4. Combination as defined in claim 2, wherein the body of a disc-type valve is sealed to the pipe wall so that the bore of the valve body provides said chamber.

References Cited by the Examiner

UNITED STATES PATENTS

| 2,599,583 | 6/1952 | Robinson et al. | |
| 2,780,094 | 2/1957 | Fink | 73—53 |
| 2,976,728 | 3/1961 | Brogan et al. | |
| 3,085,424 | 4/1963 | Berg | 73—53 |

DAVID SCHONBERG, *Primary Examiner.*